Aug. 7, 1928.

W. F. HELMOND 1,679,901

TYPEWRITING MACHINE

Filed Dec. 21, 1925

Inventor:
William F. Helmond
by B C Stickney
Attorney

Patented Aug. 7, 1928.

1,679,901

UNITED STATES PATENT OFFICE.

WILLIAM F. HELMOND, OF HARTFORD, CONNECTICUT, ASSIGNOR TO UNDERWOOD ELLIOTT FISHER COMPANY, OF NEW YORK, N. Y., A CORPORATION OF DELAWARE.

TYPEWRITING MACHINE.

Application filed December 21, 1925. Serial No. 76,617.

This invention relates to typewriter-escapement mechanisms.

One object of the invention is to reduce the noise due to the impact of the stepping dog. In the Underwood typewriter, the stepping dog oscillates about a pivot fixed in a dog-rocker. Said dog-rocker comprises also a spring-pressed wheel-check-pawl and a fixed dog besides the stepping dog.

One swing of the stepping dog occurs when said dog is tripped to engage the advancing escapement-wheel tooth. The return swing occurs as said dog intercepts the advancing tooth to check the letter-feeding movement of the carriage.

The tripping swing of the stepping dog is checked and the impact softened by the spring related to the wheel-check-pawl; said wheel-check-pawl, as already mentioned, is an element of the escapement mechanism, and, as is well known, its function being to hold the escapement-wheel while the typewriter-carriage is returned. By suitable construction, as to form and position, the wheel-check-pawl-spring is made to check and cushion said dog in its tripping movement.

The letter-feeding swing of the stepping dog has all the momentum of the typewriter-carriage behind it, and its movement is checked and the impact softened, with a consequent reduction of noise, by means of an idle interfering lever. Said interfering lever is constructed and pivoted in such relation to the stepping dog, that the initial space between the impacting surfaces is very small, preferably not over $\frac{1}{32}$ of an inch. As the force of impact varies as the square of the space traversed in a given time, the small initial space between the impacting surfaces produces little or no noise. The levers swing loosely as a unit, but their swing is self-limited, owing to their interference with each other. The carriage is thus arrested without using a noisy abutment.

Another feature of improvement is the shortening of the lever-arm distance of the dog-rocker. By shortening this distance, an escapement action results that is more speedy as measured by that portion of the type-bar movement required to actuate the dog-rocker.

Other features and advantages will hereinafter appear.

In the accompanying drawings,

Figure 1 is a sectional side view of a typewriter, showing only such portions as are needed to illustrate this invention.

Figure 2 is a rear view of a dog-rocker and its associated parts.

Figure 3 is a top plan view of the dog-rocker with the parts in the position shown in Figure 2.

Figure 4 is a diagram of views illustrating the action between the special lever and the dog-rocker.

Figure 5 is a view similar to Figure 2, but showing the dog-rocker operated, so as to release the stepping dog to effect a letter-feeding movement of the escapement-wheel on the return of said dog-rocker to normal position.

Figure 6 illustrates the special lever with modified contact surfaces.

The invention is herein illustrated in connection with an Underwood typewriting machine, in which type-bars 10 are swung upwardly and rearwardly about a fulcrum 11 by depression of their respective keys, not shown, to print against a work-sheet, not shown, fed around a platen 12. The platen is supported in a carriage 13, which travels back and forth on means including a rail 14 secured to machine-frame 15. A spring-drum 16, connected by a draw-band 17 to a stud 18 on said carriage, pulls it in a letter-feeding direction.

The letter-feed movements of the carriage are controlled by an escapement-device indicated generally at 20. This escapement-device includes an escapement-wheel 21, connected through a spring-pressed one-way pawl 22 to a pinion 23, which meshes with a feed-rack 24 supported on the typewriter-carriage 13. The escapement-wheel has teeth 25, which engage, one at a time and successively, a stepping dog 26 and a fixed dog 27. The fixed dog 27 is integral with a dog-rocker 28, which is pivotally supported on pivots 29 in a bracket 30.

The pull of a spring 31 has two components, one of which urges the dog 26 to rotate about its pivot 48 fixed in the dog-rocker 28; and the other component rotates the dog-rocker 28 about its pivots 29 against a rearward extension 34 of a universal bar 32. Said universal bar 32 is a medium through which each type-bar 10 may actuate the dog-rocker 28, to produce a letter-feed movement of the carriage. Heels 33 of the type-bars engage the universal bar. The rearward extension of the universal bar is guided and supported by arms 35 of a frame 36, which is pivoted at 38. The universal bar engages the dog-rocker 28 by means of a tab 40 at 41, which is the end of the adjustable screw usually provided to adjust the faces of the dogs in relation to the escapement-wheel. Heretofore, the dog-rocker has been engaged at a point substantially in line with the rearward extension 34. As already explained, the engagement of the dog-rocker at a point closer to its pivots, results in a more speedy escapement action, as it is actuated by a smaller portion of the type-bar movement.

The lowering of said screw 41 also facilitates access to it for adjustment, which heretofore has been difficult on account of the structure of the typewriter. The rearward etxension 34 remains unchanged, forming a chord to stiffen the arcuate universal bar 32.

The dog 26 is arrested in its normal or carriage-checking position, Figure 2, by a special stop-lever or member 43. The action of this special lever 43 in relation to the stepping dog may be explained by referring to Figure 4. The stepping dog is made similar in form to the special stop-lever by providing it with the extension 45.

Referring to Figure 4, the view designated as A shows the position assumed by the stepping dog 26 after it is released by the escapement tooth 21$^a$ and vibrated about its pivot 48 by the spring 31 a stepping distance predetermined by the coaction of the extension 45 of the dog with the lower arm 46 of the lever 43 to vibrate the arm 46 against the flexible stop 58 for a stop position. This stepping movement of the dog 26, through the relative eccentricity of the two pivots 48 and 44, develops a gap 47 between the upper end 43$^a$ of the lever 43 and the adjacent face of the dog 26. The width of this gap may be predetermined by the distance separating the two pivots 48 and 44 and the distance to be traveled by the stepping dog which is a fixed factor determined by the spacing of the escapement teeth 25. The view designated as B shows the next advancing tooth 21$^b$ in contact with the face of the stepping dog, and the dog vibrated against its spring 31 to a point where said dog contacts with the arm 43$^a$, and, in thus initially closing up the gap 47 at the upper end of the lever 43, simultaneously forms a corresponding gap 47$^a$ between the extension 45 and the lower arm 46 of the lever 43. The tooth 21$^b$ in advancing in a letter-space direction from the position of B forces the tooth-driven dog 26 to become a driving element against the arm 43$^a$ of the lever 43. The arm 43$^a$ in swinging about its pivot 44 forces the point of contact between the dog and arm to gradually creep away from the axis of the dog, while the resultant movement of the lower arm 46 of the lever progressively moves towards the face of the extension 45 of the dog and progressively moves towards the axis of the dog. This differential translation of derived and imparted movements of these interfering levers continues until the working area of the gap 47$^a$ is absorbed or closed, when the two points of coincidence between the stop lever and the dog check the movement of the tooth 21$^b$ at the position shown at C, where it will be noticed that the point of contact between the arm 43$^a$ and the dog has shifted away from the axis of the dog and the point of contact between the arm 46 and the extension 45 has shifted towards the axis of the dog and that both shifting movements were progressively accelerated. Hence, when the interfering levers have assumed positions as at C, their limit of movement is reached, or the arrest of the dog 26 has been accomplished, not by a sudden direct impact against the two arms of the lever 43, but the two points of coincidence where the arms 46 and 43$^a$ jointly arrest the dog are approached differentially or at a varying velocity which develops a joint creeping frictional contact at both these two points. This rubbing together reduces the noise of impact and also eliminates the tendency of the escapement tooth to recoil from the dog to promote irregular spacing between adjoining typed characters.

It has been established by experiment that a gap 47 of about one-thirty-second of an inch meets the typewriter conditions for speed and does not interfere with the action of the spring 31 by developing excessive friction where the stop lever engages with the dog. Noise and rebound are prevented, but not enough to interfere with a quick and free release of the dog 26, or cause undue wear of the rubbing surfaces. Neither must there be a sacrifice of positiveness in arresting the typewriter carriage in its letter-feed movement. These contrary considerations have been met and accommodated by the devices herein described and illustrated. The result is that the usual sharp and concussive clicks and noises from the escapement mechanism have been transformed to a dull, soft thud which is not at all objectionable, and the tendency of the typewriter carriage to rebound has been practically eliminated. The means by which this has been accomplished are unusually simple, including only one additional lever with its pivot and the suitably adapted wheel-check pawl-spring which will be described more fully.

The stepping dog 26 is, as heretofore, pivotally mounted on a headed pivot 48. The special lever 43 is also pivotally mounted on a headed pivot 44.

The usual wheel-check-pawl 49 has been modified in form, as shown in Figures 2 and 5. Said wheel-check-pawl is pivoted on a shoulder-screw 50. A spring 51 has tabs 52 which press against and embrace the lower extension of the wheel-check-pawl. The upper part of the wheel-check-pawl rests against a boss 53 under the influence of the spring 51. As usual there is enough play about the shoulder of the screw 50 to permit the upper end of the wheel-check-pawl to yield if said upper end should encounter the side face of the teeth of the escapement wheel on the return swing of the dog-rocker (see Figure 5). The spring 51 is set to retain the pawl in its normal fore-and-aft position and includes a body-part 55 by which it is mounted on the dog-rocker by means of screws 56 and 57; said screws passing through elongated holes in said body-part of the spring, and holding but not clamping said body-part against the dog-rocker. The resiliency of the spring-pressed body-part on account of the elongated holes gives said body-part the characteristics of a cushion for a stop member 58 thereon and engageable by the lever 43, which effectively reduces the noise of impact when the lighter spring-pressed stepping dog is arrested thereby in its stepping movement.

It will be noted that the escapement device includes two co-operative members, a dog driven by the power-driven escapement-tooth, and a stop member vibrated by the dog; that both the dog and the stop member vibrate about individual pivots on the rocker; that the relative displacement of the two pivots co-operating with the angular disposition of the two members promotes a variable velocity in the transmission from one member to the other member; that the velocity of the tooth-actuated dog is checked simultaneously at two widely-separated points of coincidence, one point at each side of the dog's axis; that these two points of coincidence between the dog and the stop member are isolated a direct concussive contact with a fixed part of the rocker; that the movement of the dog in a letter-space direction picks up the stop member and carries it along with it to the point where the velocity of the dog is checked, not abruptly, but gradually, and where the dog's velocity is arrested, not with an impact of force against a rigid part of the rocker, but by a strain developed jointly by two opposing forces at the axis of the stop member which brings said dog to a state of rest without the usual metallic ring of metal striking metal; and that all these factors are conducive to a noiseless step-by-step feeding movement of the carriage.

It has been proposed that if the ordinary stepping dog stop were located nearer to the fulcrum of the stepping dog, a reduction in noise would result; but because of recoil of the stepping dog, the dog and paper-carriage would quiver, or move slightly in the opposite direction, causing unequal spacing of letters.

Heretofore, the gap between a stepping dog and its companion rigid dog has been about $\frac{5}{32}$ of an inch, and therefore the stepping dog has struck a heavy and noisy blow; whereas with the new invention the gap may be reduced to $\frac{1}{32}$ of an inch or less, and the stepping dog, instead of striking a non-yielding member as heretofore, strikes the yielding stop-lever, the movement of which is arrested, not by a sudden impact with the rigid dog, but by a cramping effect at the two fulcrums and upper and lower sections of stop-lever and stepping dog.

It is well known that a tapered arbor will enter a tapered hole with a dull thud; and the present invention carries out a similar principle but more effectively, because of the described construction.

Variations may be resorted to within the scope of the invention, and portions of the improvements may be used without others.

Having thus described my invention, I claim:

1. In a typewriting machine, the combination of a carriage, an escapement-mechanism including a carriage-driven escapement-wheel, a stepping dog driven by the escapement-wheel to effect a carriage-feed movement, a check-pawl to limit the backward rotation of the escapement-wheel, and a spring member to jointly operate the check-pawl and provide a resilient stop for the stepping dog.

2. In a typewriting machine, the combination of a carriage, an escapement-mechanism therefor including a carriage-driven escapement-wheel, a stepping dog driven by the escapement-wheel, a stop to limit the movement of the dog in a carriage-feeding direction that is rendered operative by the stepping movement of the dog, a check-pawl to limit the backward rotation of the escapement-wheel, and a spring member to jointly operate the check-pawl and provide a resilient stop for the stepping dog.

3. In a typewriting machine, the combination with a power-driven carriage, of an escapement-mechanism therefor, including two adjacent levers side by side and pivoted eccentrically to each other, said pivoting being sufficiently close to enable said levers to loosely slide upon and interfere with each other, permitting them to have limited movements, one of said levers being a stepping dog of the escapement-mechanism, and the other being an interfering idle lever, said stepping dog being driven by the carriage, and the movement of said stepping dog being limited by the action of the interfering lever, thereby arresting said carriage with a minimum of noise.

4. In a typewriting machine, the combination with a power-driven carriage, of an escapement-mechanism therefor, including two adjacent levers side by side and pivoted eccentrically to each other, said pivoting being sufficiently close to enable said levers to loosely slide upon and interfere with each other, permitting them to have limited movements, one of said levers being a stepping dog of the escapement-mechanism, and the other being an interfering idle lever, said stepping dog being driven by the carriage, and the movement of said stepping dog being limited by the action of the interfering lever, thereby arresting said carriage with a minimum of noise, each lever having a pair of arms, one arm of the stepping-dog lever engaging an arm of the interfering lever to vibrate the latter, and the other arm of the interfering lever engaging the other arm of the dog-lever to tend to vibrate the same.

5. In a typewriting machine, the combination with a power-driven carriage, of an escapement-mechanism therefor, including two adjacent levers side by side and pivoted eccentrically to each other, said pivoting being sufficiently close to enable said levers to loosely slide upon and interfere with each other, permitting them to have limited movements, one of said levers being a stepping dog of the escapement-mechanism, and the other being an interfering idle lever, said stepping dog being driven by the carriage, and the movement of said stepping dog being limited by the action of the interfering lever, thereby arresting said carriage with a minimum of noise, the driven arm of the dog-lever tending to lengthen and the vibrating arm of the dog-lever tending to shorten, until the dog-lever is thereby arrested.

6. In a typewriting machine, the combination with a power-driven carriage, of an escapement-mechanism therefor, including two adjacent levers side by side and pivoted eccentrically to each other, said pivoting being sufficiently close to enable said levers to loosely slide upon and interfere with each other, permitting them to have limited movements, one of said levers being a stepping dog of the escapement-mechanism, and the other being an interfering idle lever, said stepping dog being driven by the carriage, and the movement of said stepping dog being limited by the action of the interfering lever, thereby arresting said carriage with a minimum of noise, the driven arm of the dog-lever tending to lengthen, and the vibrating arm of the dog-lever tending to shorten, until the dog-lever is thereby arrested, each of said levers being of the first order, and said levers engaging each other upon opposite sides of their pivots.

7. In a typewriting machine, the combination with a power-driven carriage, of an escapement-mechanism therefor, including two adjacent levers side by side and pivoted eccentrically to each other, said pivoting being sufficiently close to enable said levers to loosely slide upon and interfere with each other, permitting them to have limited movements, one of said levers being a stepping dog of the escapement-mechanism, and the other being an interfering idle lever, said stepping dog being driven by the carriage, and the movement of said stepping dog being limited by the action of the interfering lever, thereby arresting said carriage with a minimum of noise, each lever having a pair of arms, one arm of the stepping-dog lever engaging an arm of the interfering lever to vibrate the latter, and the other arm of the interfering lever engaging the other arm of the dog-lever to tend to vibrate the same, each of said levers being of the first order, and said levers engaging each other upon opposite sides of their pivots, said levers being approximately parallel, and the carriage-driven arm of the dog-lever tending to lengthen and the opposite arm of said dog-lever tending to shorten during the operation of the interfering lever by the dog-lever, thereby rendering the pair of levers self-stopping for the purpose of arresting the carriage.

8. In a typewriting machine, the combination with a power-driven carriage, of an escapement-mechanism therefor, including two adjacent levers side by side and pivoted eccentrically to each other, said pivoting being sufficiently close to enable said levers to loosely slide upon and interfere with each other, permitting them to have limited movements, one of said levers being a stepping dog of the escapement-mechanism, and the other being an interfering idle lever, said stepping dog being driven by the carriage, and the movement of said stepping dog being limited by the action of the interfering lever, thereby arresting said carriage with a minimum of noise, said escapement-mechanism including a rocker, and said levers being mounted upon said rocker.

9. In a typewriting machine, the combination of a carriage having an escapement-mechanism therefor including a rack and a pivoted stepping dog driven by the rack during a letter-spacing movement, and means for minimizing the noise of letter-spacing including a pivoted stop lever cooperative with the rack-driven movement of the pivoted stepping dog to provide a point of impact at each side of the dog's axis to jointly arrest the dog without concussion.

10. In a typewriting machine, the combination with a carriage-feeding mechanism including an escapement-wheel and a reciprocable dog-rocker having a fixed dog and a pivoted stepping dog co-operative with the escapement-wheel for letter-spacing, of a check-pawl on said rocker to prevent backward rotation of the escapement-wheel, and a device on the dog-rocker including as one part a spring for restoring the check-pawl and as another part a stop ear to arrest the stepping dog in its carriage-feeding stepping movement.

11. In a typewriting machine, the combination with a carriage-feeding mechanism including an escapement-wheel and a reciprocable dog-rocker having a fixed dog and a pivoted stepping dog co-operative with the escapement-wheel for letter-spacing, of a check-pawl on said rocker to prevent backward rotation of the escapement-wheel, a device on the dog-rocker including a spring to restore the check-pawl and a stop ear to arrest the stepping dog in its stepping movement, and a spring operatively connected to step the stepping dog and restore the dog-rocker to its normal carriage-holding position.

12. In a typewriting machine, the combination with a carriage having a carriage-feeding mechanism including a carriage toothed rack and a dog-rocker having a dog fixed thereto and a stepping dog pivotally mounted thereon and both dogs co-operating with the teeth of the rack to effect letter-space movements of the carriage, of a stop member pivoted on the dog-rocker and engageable by the stepping dog on both sides of its pivot to effect the arrest of said stepping dog at the end of each letter-space movement of the carriage.

13. In a typewriting machine, the combination with a carriage provided with an escapement-mechanism including a carriage-feed rack and a reciprocable dog-rocker having a fixed dog, of two levers of the first order pivotally supported upon individual eccentric pivots on said rocker, said levers being arranged adjacent to each other and having a working space between them to provide for a limited movement of each lever upon its pivot, said levers being swingable into contact with each other and through the eccentricity of their pivots, to effect friction one upon the other to obstruct and arrest each other, one of said levers having a dog operative to step in front of an advancing tooth of the rack and be moved by the tooth into co-operation with the other lever to arrest the carriage.

WILLIAM F. HELMOND.